United States Patent [19]
Bennett

[11] Patent Number: 4,889,248
[45] Date of Patent: Dec. 26, 1989

[54] COMBINATION CONTAINER CAP AND BLENDER ADAPTER

[75] Inventor: James R. Bennett, Fort Lauderdale, Fla.

[73] Assignee: Thermo Blender Inc., Sebastian, Fla.

[21] Appl. No.: 152,174

[22] Filed: Feb. 4, 1988

[51] Int. Cl.$^4$ .............................................. B65D 51/24
[52] U.S. Cl. .................................. 215/100 R; 366/205
[58] Field of Search ................ 366/205, 314; 141/332, 141/346, 383, 384; 215/100 R, 307, 31

[56] References Cited

U.S. PATENT DOCUMENTS

| | | | |
|---|---|---|---|
| 1,925,789 | 9/1933 | Chandler | 215/307 |
| 2,513,035 | 6/1950 | Lopata | 366/205 |
| 2,733,052 | 1/1956 | Luther | 366/205 |
| 3,344,829 | 10/1967 | Ripple | 366/205 X |
| 3,881,705 | 5/1975 | Greenspan | 366/205 X |

*Primary Examiner*—Donald F. Norton
*Attorney, Agent, or Firm*—Alvin S. Blum

[57] ABSTRACT

A combination container cap and blender adapter, for facilitating the interconnection of a standard container directly to a standard blender, the blender including a mounting attachment which allows the blender base to receive a conventional blender container in a readily removeable engagement, the blender also including rotary cutting blades which are removeably positioned within the mounting attachment, the combination container cap and blender adapter comprising a container cap means for threaded, readily removeable engagement with the container, the cap means having a generally circular configuration including a top and annular sides, the annular sides including internal threads, the cap means further including external thread means for threaded, readily removeable engagement with the mounting attachment, the external thread means protruding through the cap top and defining an interior opening, whereby the container cap and blender adapter allows a user to interface a standard container, having threads incompatible with the blender mounting arrangement, to the standard blender and directly mix or process the contents therein without the requirement of intervening utensils or special blending containers.

9 Claims, 1 Drawing Sheet

COMBINATION CONTAINER CAP AND BLENDER ADAPTER

BACKGROUND OF THE INVENTION

The subject matter of the invention relates to containers and blenders, and more particularly to a combination vacuum bottle of the THERMOS type cap and blender adapter which facilitates the interconnection of a standard vacuum bottle of the THERMOS type, having incompatible blender threads, to a standard commercially available blender.

Appliance designers have advanced the development of blender containers and mixing vessels, with the result that it is commonplace to find a blender in most U.S. households. Typical examples include devices as disclosed in U.S. Pat. No. 3,344,829 issued to M. H. Ripple, and U.S. Pat. No. 2,733,052 issued to W. P. Luther. These patents disclose blending containers which are readily mounted on a blending base which includes a rotary cutting mechanism. Numerous variations and embodiments of these devices can be found in most commonly recognized appliance stores.

However, there exists a need for an adapter which can interface a standard container, the container having threads which are incompatible with the blender attachment or the blender base that accompanies a conventional blender, and thereby allows the consumer to simply and efficiently mix or process the contents of the container with the household blender. Such a device would eliminate the need for any intervening utensils or special blender containers as presently required. This would also eliminate the needless waste of dishwashing and associated labor, electric and water bills. Such a device would extend the utility of the standard blender base for use in conjunction with a variety of standard containers, vacuum bottles, and other fruit or beverage housing which utilize standard threads for caps or jar tops which are incompatible with the blender attachments.

It is therefore highly desirable to provide a combination container cap and blender adapter for facilitating the interconnection of a standard container, having threads which are incompatible with a blender attachment, to a standard blender.

It is also highly desirable to provide a combination container cap and blender adapter which is cost effective yet operationally efficient.

It is also highly desirable to provide a container cap and blender adapter which can be utilized on a conventional vacuum bottle of the THERMOS type containing threads which are incompatible with the blender attachment or base, thereby allowing the contents of the thermos to be mixed or processed directly by the blender at the convenience of the consumer.

It is also highly desirable to provide a combination container cap and blender adapter which is an integrally molded unit.

It is also highly desirable to provide a container cap and blender adapter which allows standard containers to be utilized with standard blenders without the requirement of modifications.

It is also highly desirable to provide a container cap and blender adapter which eliminates the necessity of purchasing custom blending containers.

It is also highly desirable to provide a combination container cap and blender adapter which is thermally efficient.

Finally, it is highly desirable to provide a combination container cap and blender adapter which incorporates all of the above mentioned features and characteristics.

SUMMARY OF THE INVENTION

It is therefore an object of the invention to provide a combination container cap and blender adapter for facilitating the interconnection of a standard container, having threads which are incompatible with a blender attachment, to a standard blender.

It is therefore an object of the invention to provide a combination container cap and blender adapter which is cost effective yet operationally efficient.

It is therefore an object of the invention to provide a container cap and blender adapter which can be utilized on a conventional vacuum bottle of the THERMOS type containing threads which are incompatible with the blender attachment or base, thereby allowing the contents of the vacuum bottle of the THERMOS type to be mixed or processed directly by the blender at the convenience of the consumer.

It is therefore an object of the invention to provide a combination container cap and blender adapter which is an integrally molded unit.

It is therefore an object of the invention to provide a container cap and blender adapter which allows standard containers to be utilized with standard blenders without the requirement of modifications.

It is therefore an object of the invention to provide a container cap and blender adapter which eliminates the necessity of purchasing custom blending containers.

It is therefore an object of the invention to provide a combination container cap and blender adapter which is thermally efficient.

Finally, it is an object of the invention to provide a combination container cap and blender adapter which incorporates all of the above mentioned features and characteristics.

Briefly, what is provided is a combination container cap and blender adapter for facilitating the interconnection of a standard container directly to a standard blender, the blender including a mounting attachment which allows the blender base to receive a conventional blender container in a readily removable engagement, the blender also including rotary cutting blades which are removably positioned within the mounting attachment, the combination container cap and blender adapter comprising a container cap means for threaded, readily removable engagement with the container, the cap means having a generally circular configuration including a top and annular sides, the annular sides including internal threads, the cap means further including external thread means for threaded, readily removable engagement with the mounting attachment, the external thread means protruding through the cap top and defining an interior opening, whereby the container cap and blender adapter allows a user to interface a standard container, having threads incompatible with the blender mounting attachment, to the standard blender and directly mix or process the contents therein without the requirement of intervening utensils or special blending containers.

BRIEF DESCRIPTION OF THE DRAWINGS

The above mentioned and other features and objects of this invention and the manner of obtaining them will become more apparent and the invention itself will be best understood by reference to the following description of an embodiment of the invention taken in conjunction with the accompanying drawings, wherein.

DESCRIPTION OF A SPECIFIC EMBODIMENT

Figure 1:
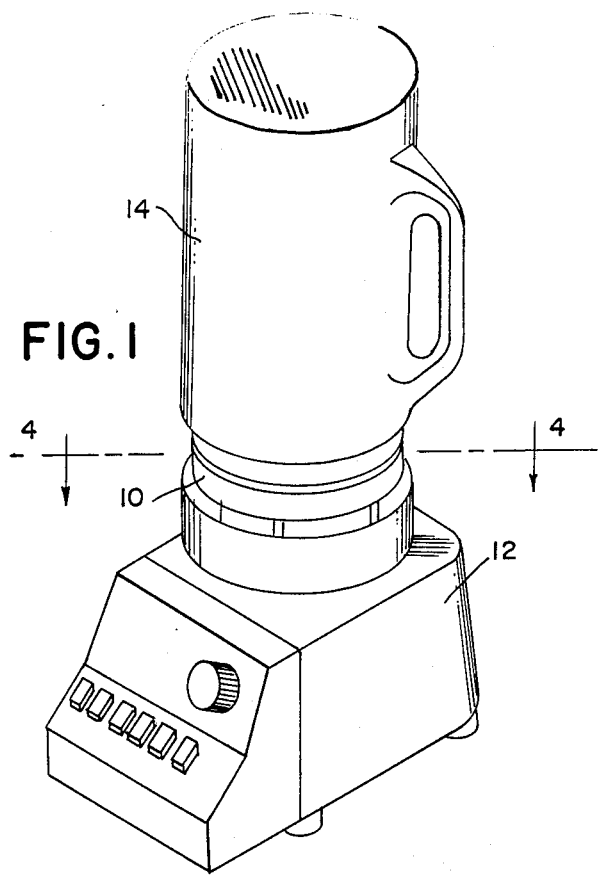
FIG. 1 is a perspective view of a blender equipped with the combination container cap and blender adapter of the present invention.
Figure 2:
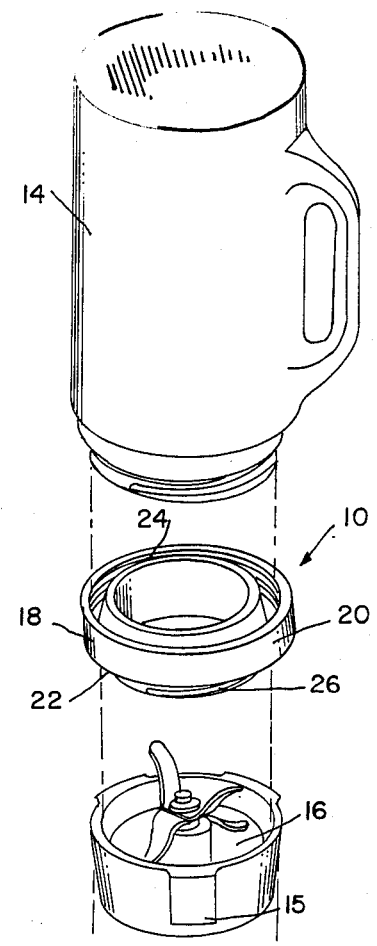
FIG. 2 is an exploded, perspective view of the apparatus illustrated in FIG. 1.

Referring now to FIGS. 1 and 2, the combination container cap and blender adapter 10 is shown as interfacing a conventional blender base 12 and container 14. The container may be a wide mouth or small mouth, hot or cold thermal container. Blender base 12 includes the conventional mounting attachment 15 and rotary blades 16. In use, the rotary blades 16 are merely placed within the mounting attachment 15 and secured therein when the blending container is threadably engaged to the attachment 15.

Figure 3:
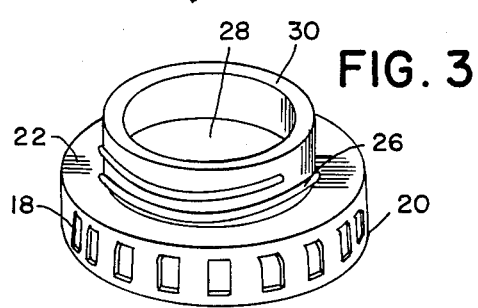
FIG. 3 is a perspective view illustrating the bottom of the container cap and blender adapter of the present invention.

The combination container cap and blender adapter 10 of the present invention is illustrated as having container cap means 18 which allows the invention to be threaded in a readily removable engagement with the container 14. Cap means 18 is shown in a generally circular configuration which includes annular sides 20, top 22, and internal threads 24. The cap means further includes external thread means 26 which extend from the edge 22 as more accurately illustrated in FIG. 3. The external thread means 26, are generally circular in shape and define an opening 28 through which the contents of the container or vacuum bottle of the THERMOS type 14 would repeatedly circulate and encounter the rotary blades 16 positioned within the mounting attachment 15.

It is apparent that the container cap and blender adapter 10 provides threaded, and readily removable engagement, with both the vacuum bottle of THERMOS type or container 14 and the mounting attachment 15 of the blender assembly. It is assembled in a matter of seconds, and allows the consumer to conveniently and easily mix the contents of a standard thermos by using a conventional blender, when without the present invention they could not otherwise do so. The invention eliminates the necessity of using a number of separate utensils or custom blender containers which are specially manufactured for use with the blender.

Internal threads 24 of the cap means 18 are of a standard and suitable size to receive the threaded neck of a conventional container or apparatus as purchased in common discount or retail stores. Similarly, external thread means 26 are of a standard and suitable size to receive the threaded portion of standard commercially available mounting attachments 15 which are commonly purchased with blenders. It is the essence of this invention that a commonly available vacuum bottle of THERMOS type can be utilized with a standard blender, when without such combination cap and blender adapter one could not do so. It will also be apparent to those of ordinary skill in the art that the pitch, dimensioning, and other design considerations of the various threads of the invention can be easily modified to be compatible with any particular container, vacuum bottle of the THERMOS type, or mounting attachment.

The diameter of the internal threads 24 is greater than the diameter of the external threads 26.

Figure 4:
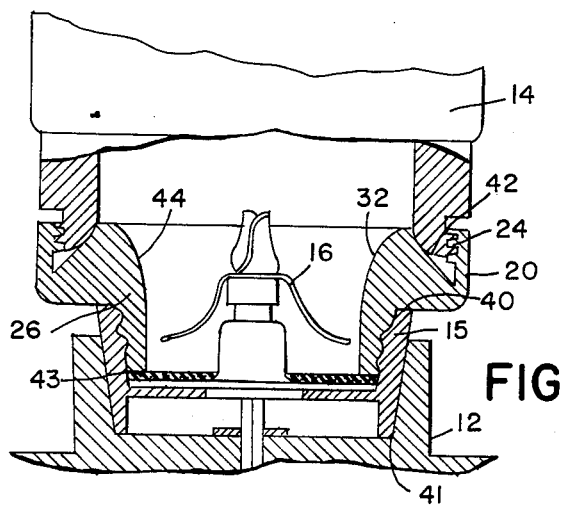
FIG. 4 is an enlarged, partial cross sectional view, taken along line 4—4 of FIG. 1.

FIG. 4 illustrates a cross sectional, partial view, of the invention when installed and interfaced between a vacuum bottle of the THERMOS type 14 and a mounting attachment 15 as described above. The cross sectional view illustrates how the cutting rotary 16 is housed within the cap means 18 in an assembled configuration. It will be appreciated that the instant invention provides a liquid impermeable seal such that the contents of the vacuum bottle of the THERMOS type 14 will not leak out of the unit.

It will be further appreciated that the smooth, gently curving interior wall 44 encloses an unencumbered internal space for the motion of the cutting rotary 16 and the free convective motion of the entire contents of the container 14 repeatedly through the blades for the usual blending and mixing operation as would be expected from the containers especially made for use with blenders.

As best seen in FIG. 4, that gently curving interior wall 44 encloses an internal space extending from a bottom circular opening to a top circular opening having an internal diameter of between 1.2 and 2 times as great as that of the bottom circular opening.

In alternative embodiments, resilient gaskets will provide a sealing means for either the cap means 18 or the external thread means 26, as desired. A resilient gasket could be placed at the base of the internal threads 24, or gasket 43 placed on the external edge 30 of the external thread means 26 to provide such seal as shown in FIG. 4.

FIG. 4 illustrates an interfacing means 32 which is positioned within the container cap means 18. The interfacing means 32, in one embodiment, is a generally wedge-shaped interior wall which is integrally associated with the internal threads 24 of the cap means as well as the interior wall of external thread means 26. In one embodiment, the interfacing means 32 is a generally wedge-shaped annular interior wall which provides physical alignment when placing a container or thermos 14 into the cap means 18. Alternately, the interfacing means 32 can provide a liquid seal or barrier which prevents leakage of the contents of the container 14.

The instant invention has particular utility in connection with vacuum bottles, cooling or heating containers. It is of notable convenience to have a vacuum bottle which can be instantly utilized in conjunction with a blender assembly. No such bottle exists on the market today and if a consumer desired to blend or otherwise process the contents of the vacuum bottle of THERMOS type, they would have to transfer the liquid to a special blending container which would then be used with the blender. The instant invention allows the vacuum bottle of THERMOS type contents to be directly mixed with any common blender. For example, milkshakes, frozen daiquiris, pina coladas, or similar food stuffs could be stored within the vacuum bottle of THERMOS type and at the appropriate time further mixed or processed by the blender. This would eliminate the need for refrigeration of the food container which would allow the use of a blender in boats, motor homes, and other recreational vehicles which do not have a refrigerator. Similar applications would include the use of blenders at office parties, work facilities, or other buildings or structures which do not provide ready access to a refrigeration means. Endless further examples will appear to those of ordinary skill in the art as well as to ordinary consumers.

In the caes of a plastic, ABS or polyurethane container 14, ring cap means 18 and the mounting attachment 15, the system requires no gaskets as shown in FIG. 2. When other materials are used, a gasket may be placed at 40 or 41 and at 42 to prevent leakage.

While there have been described above the principles of this invention in connection with specific apparatus, it is to be clearly understood that this description is made only by way of example and not as a limitation to the scope of the invention.

What is claimed is:

1. A combination container cap and blender adapter, for facilitating the interconnection of a standard commercially available insulated container of the THERMOS type and a standard commercially available blender, said blender including a mounting attachment which allows the blender base to receive a special blender container in readily removable engagement, said blender also including rotary cutting blades which are removably positioned within said mounting attachment, said combination cap and blender adapter comprising:

cap means for threaded, readily removable engagement with said container said cap means having a generally circular configuration including a top and annular sides, said annular sides including internal threads, said cap means further including external thread means for threaded, readily removable engagement with said mounting attachment, said external thread means having a smaller diameter than said internal threads and defining an interior opening, said cap and blender adapter being an integrally molded unit, said cap and blender adapter including sealing means for providing a liquid impermeable barrier between said mounting attachment, said cap and blender adapter, and said container;

interfacing means positioned within said cap means, for physically aligning said standard container with said cap means to facilitate said threaded engagement;

said interfacing means integrally associated with said cap means and said internal thread means interior opening;

whereby said cap and blender adapter allows a user to interface a standard insulated container of the THERMOS type having threads incompatible with said blender mounting attachment to said standard blender and directly mix or process the contents therein without the requirement of intervening utensils or special blending containers.

2. A combination container cap and blender adapter, for facilitating the interconnection of a standard container directly to a standard blender, said blender including a mounting attachment which allows the blender base to receive a special blender container in readily removable engagement, said blender also including rotary cutting blades which are removably positioned within said mounting attachment, said combination container cap and blender adapter comprising:

(a) container cap means for threaded, readily removable engagement with said container, said cap means having a generally circular configuration including a top, a bottom, and annular side wall extending from a generally circular bottom opening in said bottom to a larger top opening having an inside diameter of between 1.2 and 2 times said bottom opening inside diameter defining a large open space for the free circulation of the contents of said container to said rotary blades;

(b) external thread means for threaded, readily removable engagement with said mounting attachment, said external thread means formed in said annular side wall and extending upward from said bottom;

(c) internal thread means formed in said annular side wall and extending downward from said top, said internal thread means for readily removable threaded engagement with said standard container, said internal thread means having a diameter greater than the diameter of said external thread means, whereby said container cap and blender adapter allows a user to interface a standard container, having threads incompatible with said blender mounting attachment, to said standard blender and directly mix or process the contents therein without the requirement of intervening utensils or special blending containers.

3. The apparatus of claim 2 wherein said internal thread means are compatible with a thermally insulated container.

4. The apparatus of claim 3 wherein said container is an insulated container of the THERMOS type.

5. The apparatus of claim 2 wherein said container cap and blender adapter is an integrally molded unit.

6. The apparatus of claim 2 further comprising sealing means for providing a liquid impermeable barrier between said mounting attachment, said container cap and blender adapter, and said container.

7. The apparatus of claim 6 wherein said sealing means includes a resilient gasket.

8. The apparatus of claim 2 further comprising: interfacing means, positioned within said container cap means for physically aligning said standard container with said cap means to facilitate said threaded engagement.

9. The apparatus of claim 8 wherein said interfacing means comprises generally wedged shape interior walls, said interior walls integrally associated with said cap means and the interior opening of said interior thread means.

* * * * *